(12) United States Patent
Rump (10) Patent No.: US 7,434,052 B1
(45) Date of Patent: Oct. 7, 2008

(54) METHOD AND DEVICE FOR PRODUCING AN ENCRYPTED PAYLOAD DATA STREAM AND METHOD AND DEVICE FOR DECRYPTING AN ENCRYPTED PAYLOAD DATA STREAM

(75) Inventor: Niels Rump, Kent (GB)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/913,686

(22) PCT Filed: Dec. 15, 1999

(86) PCT No.: PCT/EP99/09981

§ 371 (c)(1),
(2), (4) Date: Jan. 24, 2002

(87) PCT Pub. No.: WO00/49763

PCT Pub. Date: Aug. 24, 2000

(30) Foreign Application Priority Data

Feb. 16, 1999 (DE) .................. 199 06 450

(51) Int. Cl.
*H04L 9/08* (2006.01)
*H04L 9/30* (2006.01)
*H04L 9/16* (2006.01)

(52) U.S. Cl. .................. 713/171; 713/160; 713/161; 380/45; 380/260; 380/261; 380/284

(58) Field of Classification Search ............ 380/45, 380/284, 260–261; 713/160–161, 201, 171
See application file for complete search history.

(56) References Cited

U.S. PATENT DOCUMENTS 4,899,333 A * 2/1990 Roediger .................. 370/427

(Continued)

FOREIGN PATENT DOCUMENTS

DE    196 25 635 C1    12/1997

(Continued)

OTHER PUBLICATIONS

Schneier, Bruce "Applied Cryptography Second Edition" John Wiley and Sons, pp. 30-31 and 53-54.*

(Continued)

*Primary Examiner*—Ayaz Sheikh
*Assistant Examiner*—Matthew T. Henning
(74) *Attorney, Agent, or Firm*—Glenn Patent Group; Michael A. Glenn (57) ABSTRACT

In a method for producing an encrypted method payload data stream comprising a header and a block containing encrypted payload data, a payload data key for a payload data encryption algorithm for encrypting payload data is generated. The payload data is encrypted using the generated payload data key and the payload data encryption algorithm to obtain the block containing the encrypted payload data of the payload stream. A part of the payload data stream is processed to deduce information marking the part of the payload data stream. The information is linked with the payload data by means of an invertible logic linkage to obtain a basic value. This basic value is finally encrypted using a key of two keys being different from each other by an asymmetrical encryption method, the two different keys being the public and the private keys respectively for the asymmetrical encryption method to obtain an output value being an encrypted version of the payload data key. The output value is finally entered into the header to complete the payload stream. Changes of the header and of the payload data itself, which are not authorized, lead to an automatic destruction of the payload data.

30 Claims, 4 Drawing Sheets

U.S. PATENT DOCUMENTS

| | | | |
|---|---|---|---|
| 4,965,825 A * | 10/1990 | Harvey et al. | 380/233 |
| 5,159,633 A | 10/1992 | Nakamura | |
| 5,200,999 A * | 4/1993 | Matyas et al. | 380/277 |
| 5,315,635 A * | 5/1994 | Kane et al. | 340/7.29 |
| 5,710,814 A * | 1/1998 | Klemba et al. | 713/173 |
| 5,712,914 A | 1/1998 | Aucsmith et al. | |
| 5,805,700 A * | 9/1998 | Nardone et al. | 380/217 |
| 5,850,443 A * | 12/1998 | Van Oorschot et al. | 380/285 |
| 5,974,144 A | 10/1999 | Brandman | |
| 6,148,404 A * | 11/2000 | Yatsukawa | 726/2 |
| 6,175,626 B1 * | 1/2001 | Aucsmith et al. | 380/30 |
| 6,198,875 B1 * | 3/2001 | Edenson et al. | 386/94 |
| 6,526,509 B1 * | 2/2003 | Horn et al. | 713/171 |
| 6,738,907 B1 * | 5/2004 | Carter | 726/9 |
| 6,892,306 B1 * | 5/2005 | En-Seung et al. | 713/193 |
| 7,117,361 B1 * | 10/2006 | Hild et al. | 713/161 |
| 7,127,612 B1 * | 10/2006 | Ishibashi | 713/169 |
| 7,159,126 B2 * | 1/2007 | Kang et al. | 713/193 |
| 7,218,736 B1 * | 5/2007 | Nishimura et al. | 380/201 |
| 7,239,709 B1 * | 7/2007 | Yamada et al. | 380/281 |

FOREIGN PATENT DOCUMENTS

| | | |
|---|---|---|
| EP | 0 438 154 A3 | 7/1991 |
| EP | 0833241 A2 | 4/1998 |
| WO | WO 96/27155 | 9/1996 |

OTHER PUBLICATIONS

Bruch Schneier, "Applied Cryptography—Protocols, Algorithms, and Source Code in C," 2nd ed., John Wiley & Sons, Inc. (1996).

*A Capsulated Content Providing Services Adaptable for Users; Huma Media Res.Labs.; NEC Corporation.*

* cited by examiner

METHOD AND DEVICE FOR PRODUCING AN ENCRYPTED PAYLOAD DATA STREAM AND METHOD AND DEVICE FOR DECRYPTING AN ENCRYPTED PAYLOAD DATA STREAM

FIELD OF THE INVENTION

The present invention relates to the encryption and decryption of payload data and in particular to an encryption concept in which the payload data is encrypted by means of a certain key, the key being encrypted in turn to realize a customer-selective transmission of payload data.

BACKGROUND OF THE INVENTION AND PRIOR ART

With the occurrence of telecommunication networks and in particular due to the huge spreading of multimedia data-capable personal computers and, most recently, of so-called solid state players, a need has arisen to market digital multimedia data, such as digital audio data and/or digital video data, commercially. Telecommunication networks for example can be analog telephone lines, digital telephone lines, such as ISDN, or the Internet. Among the commercial providers of multimedia products there is a need to sell or lend multimedia data, wherein it should be possible for a customer to be able to select a certain product individually at any time from a certain catalogue, this product then of course being only allowed to be used by the customer who has paid for it.

Unlike well-known encrypted television programs, such as the television channel Premiere, in which the emitted data is encrypted in the same way for all users who have acquired a suitable decryption device by paying a certain charge, the present invention is to provide methods and devices enabling an individual, customer-selective and safe encryption and decryption of multimedia data. Unlike the television channels mentioned above which give a fixed program all of which the user has to decide for, the methods and devices of the present invention enable a maximum freedom of selection for the user, which means that the user has only to pay for those products he or she actually wants to use.

DE 196 25 635 C1 describes methods and devices for encrypting and decrypting multimedia data, the multimedia data being present in the form of an encrypted multimedia file comprising a destination data block and a payload data block. Parts of the destination data block and at least some parts of the payload data block are encrypted by means of different keys, especially symmetrical encryption methods being used.

Symmetrical encryption methods on the one hand have the advantage that they can work relatively quickly, on the other hand the user who wants to decrypt the file needs the same key as the provider, such as the German company Deutsche Telekom, who has encrypted the multimedia data to sell it to the customer. Thus, both the provider and the user, that is the customer, on the one hand have a table with many possible symmetrical encryption algorithms, such as DES or Blowfish, and on the other hand a table for possible keys in such a way that the provider generates an entry into the destination data block of the multimedia data, the entry being used by the user to access his key table to select the correct key for the encryption.

Due to the rapidly increasing spreading of the MP3 standard so-called solid-state-players have emerged on the market, these players being used for decrypting and replaying multimedia data. These instruments are intended to be good value and thus can only comprise a limited amount of memory space and computing power. Unlike personal computers in which the resources present exceed the resources necessary for decrypting multimedia by far, solid-state-players or stereo systems are car hi-fi instruments must be good value in order to be competitive on the hard fought for market. In addition it is necessary to relieve these instruments, concerning the computing power and memory space, as far as possible when decrypting and replaying the decrypted multimedia data. On the other hand there is still the demand that the encryption techniques used be adequately safe to be trustworthy for the customer and to prevent an abuse even of encrypted multimedia data. In addition copyright violations are to be fought effectively, especially when multimedia data is replayed without an authorization by the author or the commercialisation company respectively or when it is changed without having an authorization to do so.

SUMMARY OF THE INVENTION

It is the object of the present invention to create an efficient and safe concept for encrypting and decrypting of multimedia data respectively.

In accordance with a first aspect of the present invention, this object is achieved by a method for producing a payload data stream comprising a header and a payload data block containing encrypted payload data, comprising the following steps: generating a payload data key for a payload data encryption algorithm for encrypting payload data; encrypting payload data using said payload data key and said payload data encryption algorithm to obtain an encrypted section of said payload data block of said payload data stream; processing a part of said payload data stream to deduce information marking said part of said payload data stream; linking said information containing said payload data key by means of an invertible logic linkage to obtain a basic value; encrypting said basic value using a key of two keys being different from each other by an asymmetrical encryption method, said two different keys being the public and the private keys respectively for said asymmetrical encryption method, to obtain an output value being an encrypted version of said payload data key; and entering said output value into said header of said payload data stream.

In accordance with a second aspect of the present invention, this object is achieved by a method for decrypting an encrypted payload data stream comprising a header and a payload data block containing encrypted payload data, said header comprising an output value having been generated by an encryption of a basic value by an asymmetrical encryption method using a key of two different keys including a private and a public key, said basic value representing a linkage of a payload data key, with which said encrypted payload data is encrypted using a payload data encryption algorithm, and information deduced by a certain processing, said information marking a certain part of said payload data stream unambiguously, said method comprising the following steps: obtaining said output value from said header; decrypting said output value using the other key of said asymmetrical encryption method to obtain said basic value; processing a part of said payload data stream using the processing method used for encrypting to deduce information marking said part, said part corresponding to said certain part when encrypting; linking said information and said basic value using the corresponding linkage as it has been used when encrypting to obtain said payload data key; and decrypting said block containing encrypted payload data using said payload data key and said payload data encryption algorithm used when encrypting.

In accordance with a third aspect of the present invention, this object is achieved by a device for producing an encrypted payload data stream comprising a header and a payload data block containing encrypted payload data, comprising: means for generating a payload data key for a payload data encryption algorithm for encrypting said payload data; means for encrypting payload data using said payload data key and said payload data encryption algorithm to obtain an encrypted section of said payload data block of said payload data stream; means for processing a part of said payload data stream to deduce information marking said part of said payload data stream; means for linking said information and said payload data key by means of an invertible logic linkage to obtain a basic value; means for encrypting said basic value using a key of two keys being different from each other by an asymmetrical encryption method, said two different keys being the public and the private keys respectively for said asymmetrical encryption method to obtain an output value being an encrypted version of said payload data key; and means for entering said output value into said header of said payload data stream.

In accordance with a fourth aspect of the present invention, this object is achieved by a device for decrypting an encrypted payload data stream comprising a header and a block containing encrypted payload data, said header comprising an output value having been generated by an encryption of a basic value by an asymmetrical encryption method using a key of two different keys including a private and a public key, said basic value representing a linkage of a payload data key, with which said encrypted payload data is encrypted using a payload data encryption algorithm, and information deduced by a certain processing, said information marking a certain part of said payload data stream unambiguously, said device further comprising: means for obtaining said output value from said header; means for decrypting said output value using said other key and said asymmetrical encryption method to obtain said basic value; means for processing a part of said payload data stream using the processing method used when encrypting to deduce information marking said part, said part corresponding to said certain part when encrypting; means for linking said information and said basic value using the corresponding linkage as it has been used when encrypting to obtain said payload data key; and means for decrypting said block containing encrypted payload data using said payload data key and said payload data encryption algorithm used when encrypting.

The present invention is based on the fact that a so-called hybrid encryption method has to be used in order to achieve a safe and efficient encryption, wherein the faster, for example symmetrical, encryption method or scrambling method is used for encrypting and decrypting the payload data respectively, while the slower, asymmetrical encryption concept is only used to encrypt the payload data key for the symmetrical encryption concept for example and to transmit it in this encrypted form to a user so that the user in turn can decrypt the encrypted payload data stream. Furthermore the encrypted payload data stream, which on the one hand can be a payload file or on the other hand a continuous data stream, is to be protected from illegal manipulations. In order to realize this in an efficient way and, as far as computing time is concerned, as time-saving as possible, the payload data stream itself is included in the asymmetrical encryption method for encrypting the payload data key.

It is pointed out at this stage that payload data in general includes multimedia data, that is audio data, video data or a combination of audio data and video data, but also text data for example and even binary data, such as for example executable programs. For practical reasons the subject matter of the present invention will be disclosed using multimedia data. It is however clear that all the payload data for which there is a demand for encryption can be processed by the devices and methods according to the invention.

A hash sum of a part of the multimedia data stream is preferable produced. This part could on the one hand be the header of the multimedia stream only and, on the other hand, also include parts of the encrypted and decrypted multimedia data itself.

An output value in the header which is transmitted to the customer, along with the at least partly encrypted multimedia data, in the form of multimedia data stream in a certain sense represents an encrypted version of the multimedia key, wherein to decrypt this output value again correctly to obtain the multimedia data key, apart from the key for the asymmetrical encryption method, this can be individual data created by the provider, such as license data which refers to the way how a user is allowed to use the encrypted multimedia data, as well as parts of the multimedia data itself. If a user manipulates the header by changing the expiration date of his license to use a certain piece of multimedia for example, he can on no account find out the correct key for decrypting the encrypted multimedia data since a correct decryption of the output value will no longer be possible.

It is a substantial advantage of the method that, as soon as somebody changes the header, the hash sum on the header changes, too. Thus it is no longer possible to find out the key for decrypting the multimedia data correctly. Thus any change of the header automatically leads to the destruction of the multimedia data itself.

This "implicit" protection of the header does not include an encryption of the header, which is why it does not have to be decrypted, a fact that in turn can be made use of for saving resources in the replay instruments. Of course such an encryption of the header would easily be possible if there were the wish to do so.

In an analog way a change of the multimedia data, when encrypted or unencrypted multimedia data itself is included in the encryption of the multimedia data key, leads to an automatic destruction of all the multimedia data.

BRIEF DESCRIPTION OF THE DRAWINGS

Preferred embodiments of the present invention are hereinafter described in detail referring to the appended drawings, in which.

DETAILED DESCRIPTION OF PREFERRED EMBODIMENTS

Figure 1:
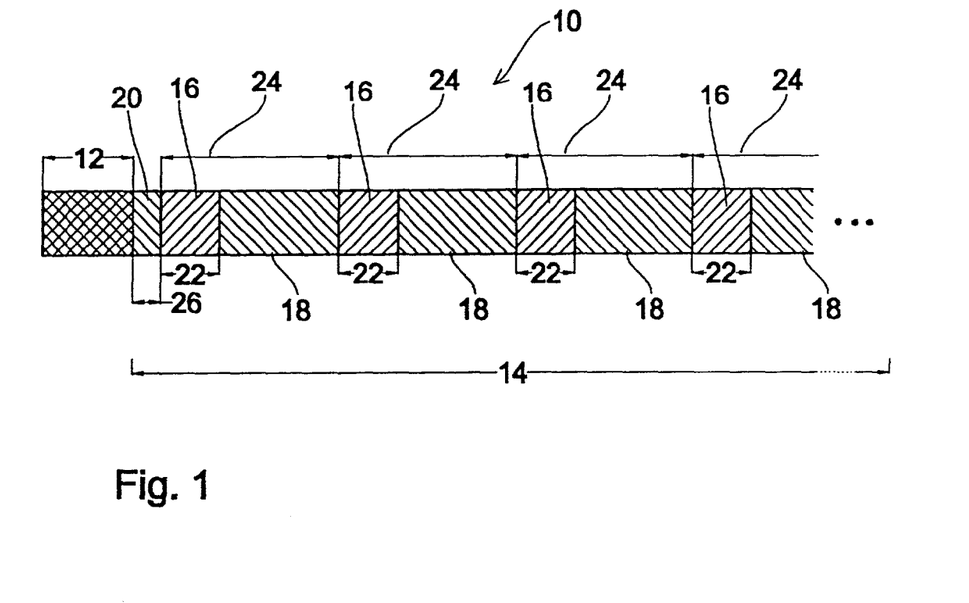
FIG. 1 shows a multimedia data stream which can be produced according to the present invention.

FIG. 1 shows an encrypted multimedia data stream 10 comprising a header 12 and a payload data block 14, that is a block containing encrypted multimedia data. The payload data block 14 includes encrypted sections 16 and unencrypted sections 18 between the encrypted sections 16. In addition a multimedia data stream which can be produced according to the present invention includes a further unencrypted section 20 following the header 12 and being arranged in front of an encrypted section 16.

Usually the multimedia data to be encrypted is encoded in any way, such as according to a MPEG standard, such as MPEG-2 AAC, MPEG-4 audio or MPEG Layer-3. It is thus sufficient to encrypt certain sections of the multimedia data to be encrypted. This leads to an essentially decreased processing expenditure both at the provider who encrypts the data and at the customer who in turn has to decrypt the data. Furthermore, the pleasure of hearing and seeing respectively of a user who only uses the unencrypted multimedia data is seriously impaired by the constantly occurring encrypted blocks, when the multimedia data is only encrypted partly.

Although FIG. 1 shows an encrypted multimedia data stream in which the header 12 is arranged at the beginning of the encrypted multimedia data stream this arrangement of the header and the payload data block is not to refer to the transmission of the encrypted multimedia data stream. The term "header" is only meant to express that a decryption device which is to decrypt the encrypted multimedia data stream at first requires at least parts of the header before the multimedia data itself can be decrypted. Depending on the transmission medium the header may also be arranged at some place in the payload data block or be received after certain parts of the payload data block when for example a packet-oriented transmission of the multimedia data stream is thought of, in which different packets, one of which may contain the header and another one a part of the payload data block, are transmitted via different physical transmission ways in such a way that the order of receipt does not have to correspond to the order of sending. However, in this case a decryption device has to be able to save the packets received and to order them again in such a way that information is extracted from the header to begin the decryption. The encrypted multimedia data stream may further be present in the form of a file or also in the form of an actual data stream, when for example a life transmission of a multimedia event is thought of. This application will especially occur with digital user-selective broadcasting.

The length of an encrypted section 16 is represented by a value amount 22 while the spacing in the encrypted multimedia data stream from the beginning of an encrypted section 16 to the beginning of the next encrypted section 16 is referred to as step 24. The length of the further encrypted section 20 is given by a value first step 26.

These values 22, 24 and 26 are obviously required for a correct decrypting of the multimedia data in a decryption device. This is why they have to be entered into the header 12 as will be explained later.

Figure 2:
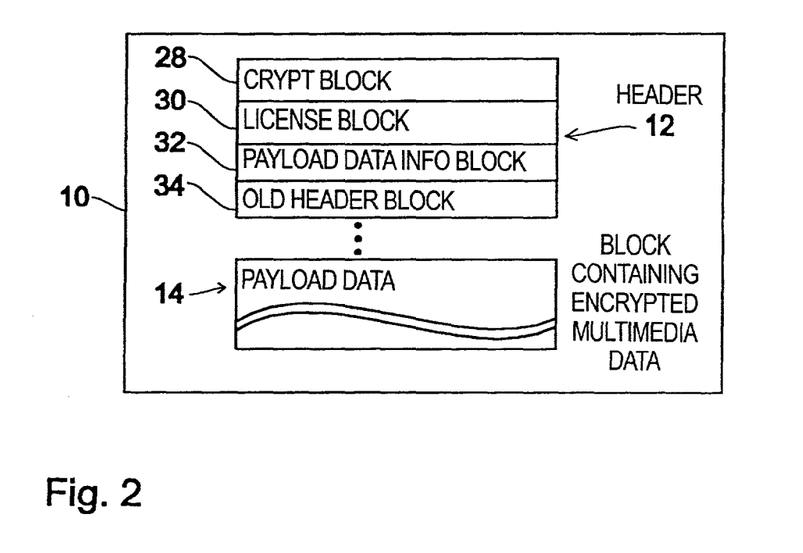
FIG. 2 shows a detailed illustration of the header and the payload data block of the encrypted multimedia data stream.

FIG. 2 shows a more detailed illustration of the encrypted multimedia data stream 10 consisting of the header 12 and the payload data block 14. The header 12 is divided into several subblocks which will be explained especially referring to FIG. 3. It is pointed out that the number and the function of the subblocks can be extended at will. Thus, in FIG. 2 some subblocks of the header 12 are illustrated in an only exemplary way. The header includes as it is shown in FIG. 2 a so-called crypt-block 29 comprising, in general terms, relevant information for encrypting the multimedia data. In addition the header 12 includes a so-called license block 30 comprising data referring to how a user can or is allowed to use the encrypted multimedia data stream. The header 12 further includes a payload data info block 32 which can include information concerning the payload data block 14 and as well as general information about the header 12 itself. Furthermore the header 12 may comprise an old header block 34 enabling a so-called recursive header structure. This block makes it possible for the user who, apart from a decryption device is also in the possession of an encryption device to reformat an encrypted multimedia data stream for other replay instruments in his possession without losing or modifying the original header information provided by the distributor. Depending on the application further subblocks, such as an IP information block (IP=intellectual property) according to ISO/IEC 14496-1, MPEG-4, Systems, 1998, containing copyright information, can be added to the header 12.

As it is the standard in the art, an internal block structure can be allocated to each block, this structure at first requesting a block identificator and including the length of the subblock and at last giving the block payload data itself. Thus, the encrypted multimedia data stream, and in particular the header of the encrypted multimedia data stream, is given an increased flexibility in such a way that it can react to new requirements in such a way that additional subblocks may be added or existing subblocks may be omitted.

Figure 3:
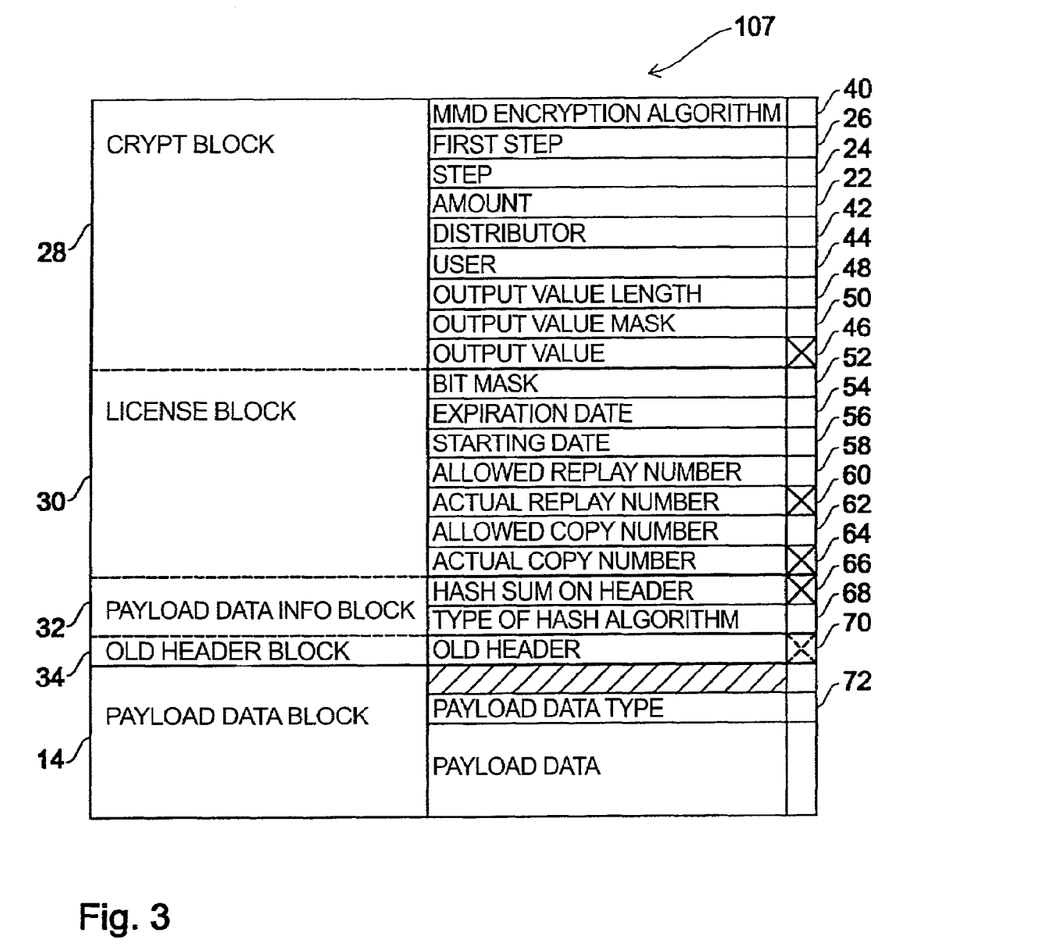
FIG. 3 shows a selection of certain entries into the individual subblocks of the header block.

FIG. 3 gives an overview of the block payload data of the individual subblocks shown in FIG. 2.

At the beginning the crypt block 28 is explained. It contains an entry for a multimedia data encryption algorithm 40 identifying the symmetrical encryption algorithm used in the preferred embodiment, which has been used when encrypting the multimedia data. The entry 40 can be an index for a table in such a way that, after reading the entry 40, a decryption device is capable of selecting this encryption algorithm the encryption device has used from a plurality of encryption algorithms. The crypt block 28 further includes the entry first step 26, the entry step 24 and the entry amount 22, which has already been illustrated in connection with FIG. 1. These entries in the header enable a decryption device to subdivide an encrypted multimedia data stream accordingly to be able to carry out a correct decryption.

The crypt block 28 further contains an entry for the distributor or provider or supplier 42, the entry being a code for the distributor who has produced the encrypted multimedia data stream. An entry user 44 identifies the user who has obtained the encrypted multimedia data stream in some way from the distributor who is identified by the entry 42. It is a possible application of these identification codes to carry out the user identification code in a device-specific way. The entry user would then contain the serial number of a PC, a laptop, a car hi-fi device, a home stereo system etc., allowing as replay on the specific instrument only. For a further increase of the flexibility and/or safety, a special identification code such as a logic linkage of the hard disk size and the processor number etc., in the example of a PC, could be employed instead of the serial number which looks different with every producer but may be identical accidentally.

The entry 46 contains an output value which will be discussed in detail later. This output value in general represents an encrypted version of the multimedia data key which, in connection with the multimedia data encryption algorithm identified by the entry 40, is required to decrypt the encrypted multimedia data (sections 16 in FIG. 1) present in the payload data block 14 correctly. In order to achieve a sufficient flexibility for future applications, the two entries output value length 48 and output value mask 50 are further provided. The entry output value length 48 illustrates the actual length of the output value 46. To achieve a flexible header format more bytes are however provided in the header format, for the output value than an output value actually comprises. The output value mask 50 thus illustrates how a shorter output value is distributed in a way on a longer output value place. If the output value length is for example half as big as the space available for the output value, the output value mask could be formed in such a way that the first half of the output value mask is set while the second half is masked. In this case the output value would simply be entered into the space provided for the header by the syntax and occupy the first half while the other half would be ignored due to the output value mask 50.

Now the license block 30 of the header 12 will be explained. The license block includes an entry bit mask 52. This entry can comprise certain specific information for replaying or for the general way of using the encrypted multimedia data. With this entry a decryption device could especially be told whether the payload data can be replayed locally or not. In addition at this point it may be signalled whether the challenge response method has been used for the encryption, this method being described in the already mentioned German patent DE 196 25 635 C1 and enabling an efficient data base access.

An entry expiration date 54 indicates the point in time at which the permission to decrypt the encrypted multimedia data stream expires. A decryption device will in this case check the entry expiration date 54 and compare it to a build-in time measuring device in order not to carry out a decryption of the encrypted multimedia data stream if the expiration date has been exceeded. This makes it possible for the provider to make encrypted multimedia data available for a limited amount of time, which has the advantage of a much more flexible handling and price setting. This flexibility is further supported by an entry starting date 56 in which it is specified from which point on an encrypted multimedia file is allowed to be decrypted. An encryption device will compare the entry starting date with its built-in watch to only carry out a decryption of the encrypted multimedia data when the current point in time is later than the starting date 56.

The entry allowed replay number 58 indicates how often the encrypted multimedia data stream can be decrypted, that is replayed. This further increases the flexibility of the provider in such a way that it for example only allows a certain number of replays compared to a certain sum which is smaller than a sum which would arise for the unlimited usage of the encrypted multimedia data stream.

For verifying and supporting respectively the entry allowed replay number 58 the license block 30 further includes an entry actual replay number 60 which could be incremented by one for example after each decryption of the encrypted multimedia data stream. A decryption device will thus always check whether the entry actual replay number is smaller than the entry allowed replay number. If this is the case, a decryption of the multimedia data is carried out. If this is not the case, a decryption is no longer carried out.

Analog to the entries 58 and 60 entries allowed copy numbers 62 and actual copy number 64 are implemented. By means of the two entries 62 and 64 it is made sure that a user of the multimedia data only copies them as often as he or she is allowed to do so by the provider or as often as he or she has paid for when purchasing the multimedia data. By the entries 58 to 64 a more effective copyright protection is assured, a selection between private users and industrial users being attainable for example by setting the entries allowed replay number 58 and allowed copy numbers 62 to a smaller value.

The licensing could for example be designed in such a way that a certain number of copies (entry 62) of the original are allowed while copies of a copy are not allowed. The header of a copy would then, unlike the header of the original, have zero as the entry allowed copy number in such a way that this copy can no longer be copied by a proper encryption/decryption device.

In the example for a multimedia data protection protocol (MMP) shown here the header 12 further contains a payload data information block 32 having in this case only two block payload data entries 66 and 68, the entry 66 containing a hash sum on the total header, while the entry 68 identifies the type of hash algorithm having been used for forming the hash sum on the total header.

In this context reference is made for example to "Applied Cryptography", Second Edition, John Wiley & Sons, Inc. by Bruce Schneider (ISBN 0 417-11709-9) including a detailed illustration of symmetrical encryption algorithms, asymmetrical encryption algorithms and hash algorithms.

The header 12 finally includes the old header block 34 which, along with the synchronizing information which is not shown in FIG. 3, comprises the entry old header 70. In the entry old header 70 the old header can be maintained by the provider if a user performs an encryption himself and thus produces a new header 12, in order not to lose essential information the provider has entered into the header. For this purpose author information (IP information block) could for example count prior user information and distributor information which enables tracing back of a multimedia file which for example has been decrypted and encrypted several times by different instruments to the original provider transparently, the author information being maintained. It is thus possible to check at any point whether an encrypted multimedia file has been acquired legally or illegally.

After having explained the format of the encrypted multimedia data stream and various functionalities of encryption and decryption devices, the method according to the invention for encrypting multimedia data will now be explained referring to FIG. 4. In a preferred application of the present invention the encryption method according to the invention is carried out at the distributor. The distributor preferably carries out a hybrid encryption method, that is a symmetrical encryption method for encrypting the multimedia data and an asymmetrical encryption method for encrypting the multimedia data key.

A customer or user who wants to purchase multimedia data from a distributor at first contacts the distributor and, for example, tells him his credit card number to which the distributor debits the payable amounts. Then the customer receives a table of the symmetrical encryption methods by the distributor. In addition the distributor and the customer exchange their respective public keys. If the user now orders a certain multimedia good from the distributor the distributor performs a customer-selective encryption for this customer.

The detailed steps for producing the encrypted multimedia data stream could look the following way. The distributor at first creates the header 12 for the multimedia file as far as it is possible until then (100). As can be seen form FIG. 3 the output value is not yet available at this point in time. For this reason the entry for the output value is left empty in step 100 in which the header 12 is created as far as possible. All the other entries in the crypt block and all the other entries in the license block however do already exist. The hash sum or else the digital signature in the entry 66 on the total header however is not yet existent, which is why this entry is left empty. The entry old header 70 will very likely remain empty if the multimedia file is encrypted by the distributor for the first time. If, however, the distributor has acquired the encrypted multimedia file from another distributor, the entry 70 may already be filled. In a step 102 the distributor establishes a multimedia data key K which, together with the multimedia data encryption algorithm being identified by the entry 40 (FIG. 3), allows an encryption of the multimedia data, which is carried out in a step 104.

According to the present invention a hash sum on the header is formed, certain parts having a predefined value (step 106). The detailed illustration of the header in FIG. 3 at the right margin contains a column 107 which is to illustrate which parts or entries respectively in the header 12 receive a predefined value when forming a has sum in step 106 (FIG. 4). The entry output value 64, the entry actual replay number 60, the entry actual copy number 64 and the entry hash sum on the header 66 and, under certain circumstances, the entry old header 70 especially receive a predefined value, as it is illustrated by the dotted cross for the entry 70. Certain parts of the header have to be given a pre-defined value when the hash sum is formed in step 106, since they are not yet fixed (output value 46) or are changed by a decryption device (entry 60 and 64). The entry 66, that is the hash sum on the header, is not yet fixed either since the output value 46 is naturally also included in it.

The entries distributor 42, user 44 and the entries into the license block 30 are however included when forming the hash sum in step 106 (FIG. 4), whereby a personalization and protection respectively of the license block entries can be achieved since the hash sum obtained in step 106 is linked with the multimedia data key to obtain a basic value (step 108).

Then the basic value obtained in step 108 is encrypted asymmetrically by means of the public key (0) of the customer (step 110). To render the encrypted multimedia data stream to a transferable format, the header is finally completed (step 112) in such a way that the output value 46 is entered into the header already created in step 100.

Figure 4:
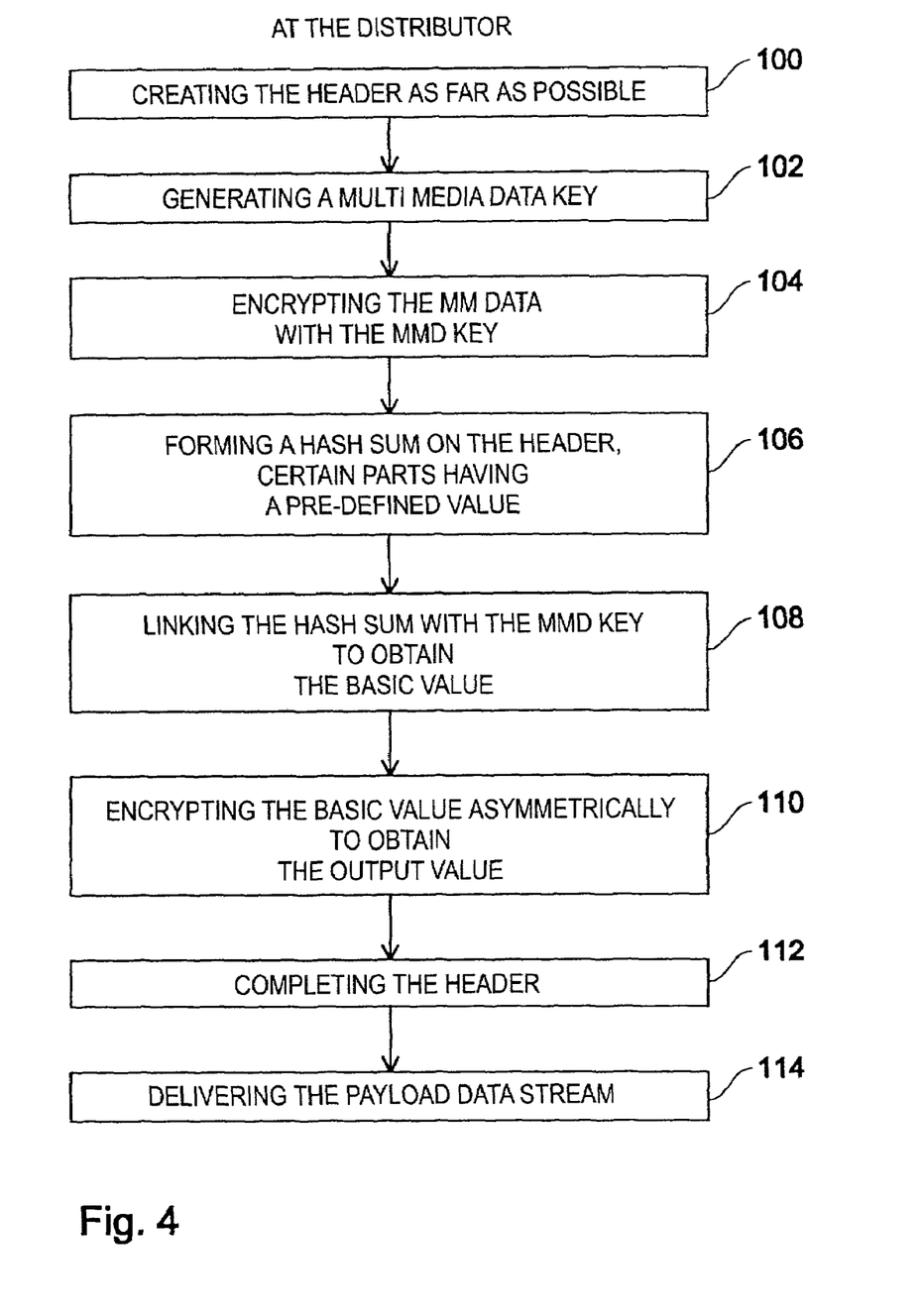
FIG. 4 shows a flow chart of the method for producing an encrypted multimedia data stream according to the present invention, which is preferable carried out at a distributor, that is a provider, of multimedia data.

Unlike the embodiment shown in FIG. 4, the order of the steps can be exchanged. The entire encryption of the multimedia data key could for example be carried out first, the encryption of the multimedia data then being performed. In addition the hash sum on the header could be established before the multimedia data key is generated. Further variations are possible. Step 108 can of course also be carried out after the hash sum has been established. Furthermore step 110 may only be carried out after a basic value has been established.

A symmetrical encryption method is preferable used for encrypting the multimedia data with the multimedia data key in step 104 since, in this case, relatively large amounts of data have to be encrypted and decrypted. Symmetrical encryption methods, as is well known, are faster than asymmetrical encryption methods as they are employed in step 110 for encrypting the multimedia data key.

It is also preferred that the multimedia data key K is generated by means of a random number generator in such a way that the basic value generated in step 108 always takes a different form for one and the same customer to make an attack on the cryptographic system as difficult as possible.

Figure 5:
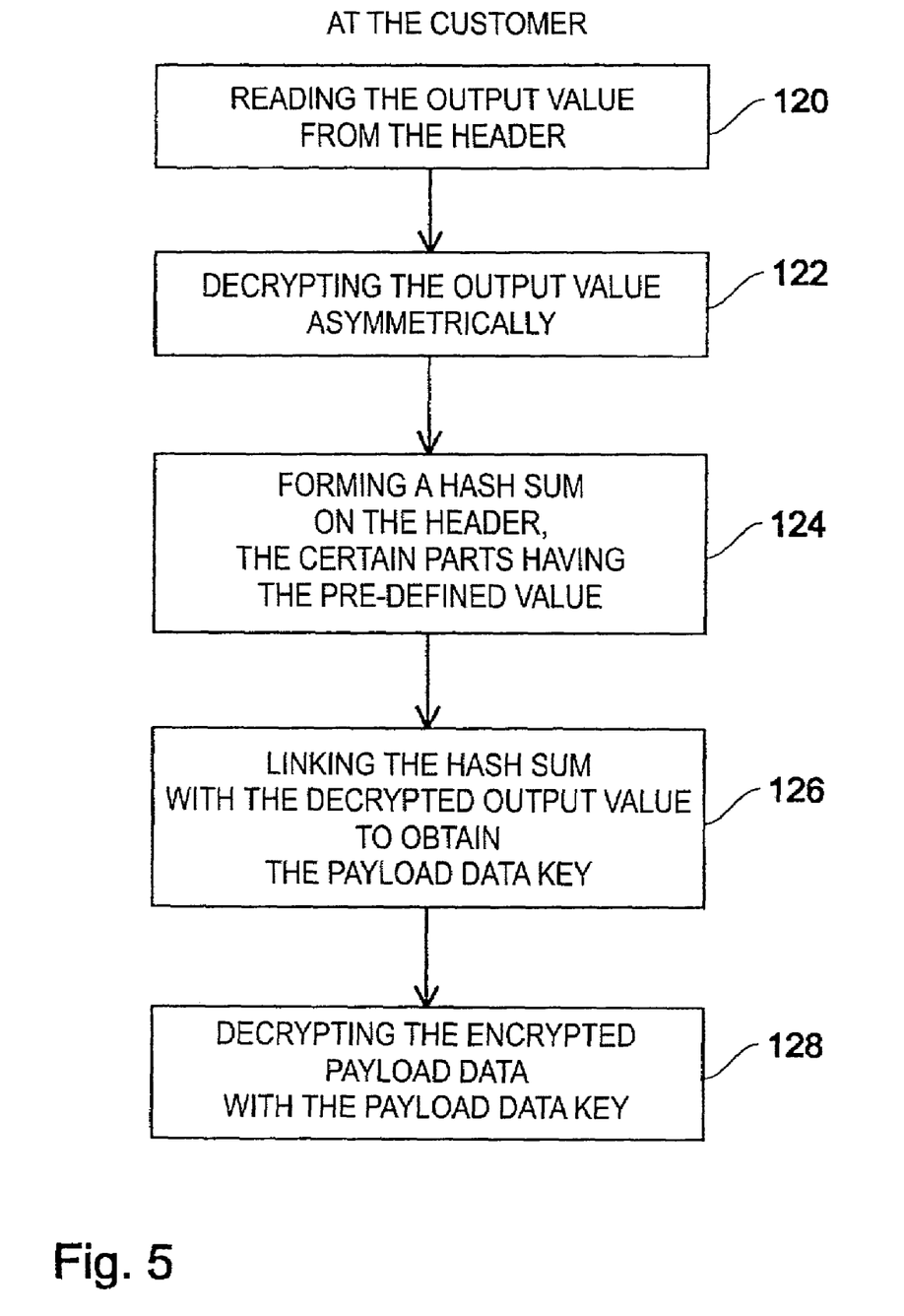
FIG. 5 shows a method for decrypting an encrypted multimedia data stream according to the present invention, which is preferable carried out at the customer or user of the multimedia data.

The linkage operation to link the hash sum and the multimedia data key K should, as will be explained referring to FIG. 5, be a self-inverse linkage. Such a self-inverse linkage would be the XOR-linkage. Self-inverse means that applying this linkage two times yields a result equal to the output value. It is also possible that the linkage function of FIG. 5 is the inverse function of that of FIG. 4. The linkage function thus only has to be reversible, that is there must be a reverse function of it.

In step 110 an asymmetrical encryption method is carried out according to the invention. As it is known, there are two keys in an asymmetrical encryption method, with the help of which an encryption and decryption respectively are possible, the keys being different from each other. One key is called private key P while the other key is called public key O. Asymmetrical encryption methods in general have the property that data to be encrypted having been encrypted by means of the private key can be decrypted again by the public key. In an analog way data to be encrypted having been encrypted by means of the public key are decrypted again by means of the private key. Thus it can be deduced that the private and public keys are in general exchangeable.

An aspect of the present invention is that the header on the steps 106 and 108 is included in the encryption of the multimedia data key. Alternatively parts of the payload data block may also be included, whereby the entire multimedia data stream would become useless due to a disallowed manipulation of the payload data since it will no longer be possible in this case to calculate the multimedia data key in the decryption device.

Although it has been mentioned in step 106 that a hash sum on the header is formed, it is also pointed out that each processing of a part of the multimedia data stream to derive information marking the part of the multimedia data stream can be employed. The more complicated the hash algorithm used herein is, the safer the encrypted multimedia data stream will be from attackers who want to crack it to modify the license information and the distributor or user information respectively for example for their (illegal) purposes.

Now reference is made to FIG. 5 which shows a flow chart of the decryption method which is possibly performed by a customer. In a step 120 the customer at first reads the output value from the header of the encrypted multimedia data stream. Then he performs a decryption of this output value by means of the respective asymmetrical decryption (step 122). Then the decryption device at the customer forms a hash sum on the header, certain parts which had predefined values when encrypted also receiving the same predefined value in a step 124. Then the hash sum with the decrypted output value (step 122) is linked, whereby the multimedia data key is formed (step 126). In a step 128 the encrypted multimedia data is finally decrypted by means of the multimedia data key obtained in step 126.

It is evident that the decryption method is basically the reversal of the encryption method having been described referring to the flow chart of FIG. 4. In the decryption method shown in FIG. 5 several steps may also be exchanged. Thus, the hash sum on the header could for example be formed (124), after which the output value is decrypted by means of the public key (step 122). Reading the output value form the header (step 120) could for example be performed after step 124 but in any case in front of step 126. Step 128 will only be possible after step 126 has been performed since it yields the multimedia data key.

The decryption method shown in FIG. 5 expresses by means of step 124, what will happen if a customer modifies the header 12 which is usually unencrypted and very easily susceptible for attackers. A change of the license information of the beginning and the end dates for example would however inevitably result in the hash sum on the header, formed in step 124, having a different value than the hash sum formed in step 106 (FIG. 4) during the encryption. The repeated linkage of the hash sum in step 126 (FIG. 5) will thus no longer result in the correct multimedia data key since the two hash sums, that is the hash sum during the encryption and the hash sum during the decryption, are different from each other. Thus the entire multimedia data is useless since it can no longer be decrypted correctly since it is no longer possible, due to the manipulation of the header, to calculate the multimedia data key the encryption device has employed. Any change of the header thus automatically leads to the destruction of the multimedia data itself.

The invention claimed is:

1. Method for producing a payload data stream comprising a header and a payload data block containing encrypted payload data, comprising the following steps:

generating a payload data key for a payload data encryption algorithm for encrypting payload data, the payload data having a first section and a second section, the first section and the second section including audio data, video data, a combination of audio data and video data, or binary data forming an executable program;

encrypting the audio data, video data, a combination of audio data and video data, or binary data forming an executable program of the first section of the payload data using said payload data key and said payload data encryption algorithm to obtain an encrypted section of said payload data block of said payload data stream, wherein the second section of the payload data remains unencrypted;

processing the audio data, video data, a combination of audio data and video data, or binary data forming an executable program of the unencrypted second section of said payload data to deduce information characterizing the unencrypted second section of said payload data;

linking said information and said payload data key by means of an invertible logic linkage to obtain a basic value;

encrypting said basic value using a key of two keys being different from each other by an asymmetrical encryption method, said two different keys being the public and the private keys respectively for said asymmetrical encryption method, to obtain an output value being an encrypted version of said payload data key; and entering said output value into said header of said payload data stream.

2. Method according to claim 1, in which said payload data encryption algorithm is a symmetrical encryption algorithm.

3. Method according to claim 1, in which said invertible logic linkage is self-inverting and includes an XOR-linkage.

4. Method according to claim 1, in which one key of said two keys being different from each other is the private key of a producer of said payload data stream or the public key of a consumer of said payload data stream.

5. Method according to claim 1, in which said part of said payload data stream being processed to deduce said information includes at least a part of said header.

6. Method according to claim 1, in which said step of processing comprises forming a hash sum.

7. Method according to claim 1, further comprising the following step:

identifying an algorithm being used in said step of processing by an entry into said header.

8. Method according to claim 1, further comprising the following step:

entering license data into said header, said license data referring to in which way said payload data stream is allowed to be employed.

9. Method according to claim 8, in which said license data indicates how often said payload data stream is allowed to be replayed and how often it has already been replayed.

10. Method according to claim 8, in which said license data indicates how often the contents of said payload data stream is allowed to be copied and how often it has already been copied.

11. Method according to claim 8, in which said license data indicates from when on said payload data stream is no longer allowed to be employed.

12. Method according to claim 8, in which said license data indicates from when on said payload data stream is allowed to be decrypted.

13. Method according to claim 8, in which said part of said payload data stream being processed to deduce said information includes said license data.

14. Method according to claim 1, in which said step of processing further comprises the following substep:

setting said entry for said output value in said header to a defined value and processing said entire header, including said entry set to a defined value.

15. Method according to claim 1, further comprising the following steps:

identifying the supplier of said payload data stream by a supplier entry into said header;

identifying the user of said payload data stream by a user entry into said header of said payload data stream, said supplier entry and said user entry belonging to said part of said payload data stream being processed to deduce said information.

16. Method according to claim 1, further comprising the following step:

identifying said payload data encryption algorithm by an entry into said header of said payload data stream.

17. Method for decrypting an encrypted payload data stream comprising a header and a payload data block containing a first section having encrypted payload data and a second section having unencrypted payload data, the first section and the second section including audio data, video data, a combination of audio data and video data, or binary data forming an executable program, said header comprising an output value having been generated by an encryption of a basic value by an asymmetrical encryption method using a key of two different keys including a private and a public key, said basic value representing a linkage of a payload data key, with which said first section having encrypted audio data, video data, a combination of audio data and video data, or binary data forming an executable program as payload data is encrypted using a payload data encryption algorithm, and information deduced by a certain processing of audio data, video data, a combination of audio data and video data, or binary data forming an executable program of the unencrypted second section of the payload data, said information characterizing a certain part of said payload data stream unambiguously, said method comprising the following steps:

obtaining said output value from said header;

decrypting said output value using the other key of said asymmetrical encryption method to obtain said basic value;

processing the audio data, video data, a combination of audio data and video data, or binary data forming an executable program of the unencrypted second section of said payload data using the processing method used when encrypting to deduce information characterizing the unencrypted second section;

linking said information and said basic value using the corresponding linkage as it has been used when encrypting to obtain said payload data key; and decrypting the audio data, video data, a combination of audio data and video data, or binary data forming an executable program of the first section containing the encrypted payload data using said payload data key and said payload data encryption algorithm used when encrypting.

18. Method according to claim 17, in which said header comprises license information referring to in what way said payload data stream can be employed.

19. Method according to claim 18, further comprising the following steps:
checking whether said license information allows a decryption; and
if a decryption is not allowed, cancelling said decryption method.

20. Method according to claim 17, in which said part being processed to deduce said information is said header.

21. Method according to claim 17, in which said header comprises a user entry, said method further comprising the following steps:
checking by means of said user entry whether a current user is authorized; and
if the user is not authorized, cancelling said decryption method.

22. Method according to claim 17, in which one key having been used when encrypting is the private key of said asymmetrical encryption method, while the other key having been used when decrypting is the public key of said asymmetrical encryption method.

23. Method according to claim 17, in which one key having been used when encrypting is the public key of said asymmetrical encryption method, while the other key having been used when decrypting is the private key of said asymmetrical encryption method.

24. Method according to claim 17, in which said step of processing includes forming a hash sum.

25. Method according to claim 17, in which a part of said header having been set to a defined value for said step of processing when encrypting is set to the same defined value for said step of processing when decrypting.

26. Method according to claim 25, in which said part of said header being set to a defined value includes said entry for said output value of said header.

27. Method according to claim 17, in which said step of linking comprises using an XOR-linkage.

28. Device for producing an encrypted payload data stream comprising a header and a payload data block containing encrypted payload data, comprising:
a generator for generating a payload data key for a payload data encryption algorithm for encrypting said payload data, the payload data having a first section and a second section, the first section and the second section including audio data, video data, a combination of audio data and video data, or binary data forming an executable program;
a first encryptor for encrypting the audio data, video data, a combination of audio data and video data, or binary data forming an executable program of the first section of the payload data using said payload data key and said payload data encryption algorithm to obtain an encrypted section of said payload data block of said payload data stream, wherein the second section of the payload data remains unencrypted;
a processor for processing the audio data, video data, a combination of audio data and video data, or binary data forming an executable program of the unencrypted second section of the payload data stream to deduce information characterizing the unencrypted second section of the payload data;
a linker for linking said information and said payload data key by means of an invertible logic linkage to obtain a basic value;
a second encryptor for encrypting said basic value using a key of two keys being different from each other by an asymmetrical encryption method, said two different keys being the public and the private keys respectively for said asymmetrical encryption method to obtain an output value being an encrypted version of said payload data key; and
means for entering said output value into said header of said payload data stream.

29. Device for decrypting an encrypted payload data stream comprising a header and a block containing a first section having encrypted payload data and a second section having unencrypted payload data, the first section and the second section including audio data, video data, a combination of audio data and video data, or binary data forming an executable program, said header comprising an output value having been generated by an encryption of a basic value by an asymmetrical encryption method using a key of two different keys including a private and a public key, said basic value representing a linkage of a payload data key, with which said first section having encrypted audio data, video data, a combination of audio data and video data, or binary data forming an executable program as payload data is encrypted using a payload data encryption algorithm, and information deduced by a certain processing of audio data, video data, a combination of audio data and video data, or binary data forming an executable program of the unencrypted second section of the payload data, said information characterizing a certain part of said payload data stream unambiguously, said device further comprising:
means for obtaining said output value from said header;
a first decryptor for decrypting said output value using said other key and said asymmetrical encryption method to obtain said basic value;
a processor for processing the audio data, video data, a combination of audio data and video data, or binary data forming an executable program of the unencrypted second section of the payload data using the processing method used when encrypting to deduce information characterizing the unencrypted second section;
a linker for linking said information and said basic value using the corresponding linkage as it has been used when encrypting to obtain said payload data key; and
a second decryptor for decrypting the audio data, video data, a combination of audio data and video data, or binary data forming an executable program of the first section containing the encrypted payload data using said payload data key and said payload data encryption algorithm used when encrypting.

30. Device according to claim 28 or 29, which is implemented as a personal computer, a stereo system, a car hi-fi instrument, a solid state player or a replay instrument containing a hard disk or a CD-ROM.

* * * * *

UNITED STATES PATENT AND TRADEMARK OFFICE
CERTIFICATE OF CORRECTION

PATENT NO. : 7,434,052 B1  
APPLICATION NO. : 09/913686  
DATED : October 7, 2008  
INVENTOR(S) : Niels Rump, Juergen Koller and Karlheinz Brandenburg Page 1 of 1

It is certified that error appears in the above-identified patent and that said Letters Patent is hereby corrected as shown below:

On the title page item (75) should read:

Inventors:    Niels Rump, Kent (GB);  
                        Juergen Koller, Erlangen (DE); and  
                        Karlheinz Brandenburg, Erlangen (DE)

Signed and Sealed this

Sixteenth Day of December, 2008

JON W. DUDAS  
*Director of the United States Patent and Trademark Office*